(12) United States Patent
Asato

(10) Patent No.: US 8,853,947 B2
(45) Date of Patent: Oct. 7, 2014

(54) LIGHTING DEVICE

(71) Applicant: Sunao Asato, Miyoshi (JP)

(72) Inventor: Sunao Asato, Miyoshi (JP)

(73) Assignee: Kume Denki Co., Ltd., Aichi (JP)

( * ) Notice: Subject to any disclaimer, the term of this patent is extended or adjusted under 35 U.S.C. 154(b) by 0 days.

(21) Appl. No.: 13/785,261

(22) Filed: Mar. 5, 2013

(65) Prior Publication Data

US 2013/0257276 A1    Oct. 3, 2013

(30) Foreign Application Priority Data

Mar. 28, 2012 (JP) ................................. 2012-075196
Feb. 20, 2013 (JP) ................................. 2013-031237

(51) Int. Cl.
*H05B 33/08* (2006.01)
*H05B 37/00* (2006.01)

(52) U.S. Cl.
CPC ............ *H05B 33/0884* (2013.01); *H05B 37/00* (2013.01); *Y02B 20/346* (2013.01); *H05B 33/0818* (2013.01)
USPC ............................................. 315/88; 315/287

(58) Field of Classification Search
USPC ........ 315/149–152, 185 R, 88, 291; 362/183, 362/157
See application file for complete search history.

(56) References Cited

U.S. PATENT DOCUMENTS

2006/0227563 A1* 10/2006 Reed et al. .................... 362/404
2009/0244881 A1* 10/2009 Butler ............................. 362/20
2010/0182774 A1* 7/2010 Kugel et al. ................... 362/183
2011/0018448 A1* 1/2011 Metchear et al. .............. 315/152
2011/0043115 A1* 2/2011 Ge et al. ........................ 315/119

FOREIGN PATENT DOCUMENTS

| JP | 2008-281874 | 11/2008 |
| JP | U-3159626 | 5/2010 |
| JP | U-3159820 | 5/2010 |
| JP | 2012-059691 | 3/2012 |

OTHER PUBLICATIONS

Mar. 4, 2014 Office Action issued in Japanese Application No. 2013-031237 (with translation).

* cited by examiner

*Primary Examiner* — Tung X Le
*Assistant Examiner* — Jonathan Cooper
(74) *Attorney, Agent, or Firm* — Oliff PLC

(57) ABSTRACT

A lighting device includes a light emitting diode (LED) lamp, a power generating panel that is disposed at a position where the power generating panel is capable of receiving sunlight and light irradiated by the LED lamp and that is configured to generate electric power by receiving the sunlight and the light irradiated by the LED lamp, a storage battery that is configured to store the electric power generated by the power generating panel and to supply the electric power to the LED lamp, a lamp drive portion that is configured to drive the LED lamp using pulse signals, a remaining amount detection portion, and a control portion that is configured to control, in accordance with the remaining amount detected by the remaining amount detection portion, a pulse width and a period that are used when the lamp drive portion drives the LED lamp.

5 Claims, 7 Drawing Sheets

LIGHTING DEVICE

CROSS-REFERENCE TO RELATED APPLICATION

This application claims priority to Japanese Patent Application No. 2012-075196, filed on Mar. 28, 2012, and also claims priority to Japanese Patent Application No. 2013-031237, filed on Feb. 20, 2013. The disclosure of the foregoing applications is hereby incorporated by reference herein in its entirety.

BACKGROUND

The present disclosure relates to a lighting device that includes a power generation panel that generates electric power by receiving light, and a storage battery that stores the generated electric power.

A lighting device for outside use is known that includes a power generation panel that generates electric power by receiving light, an energy storage device that stores the generated electric power, and a light source that is illuminated using electric power supplied from the energy storage device. Further, in order to suppress electric power consumption of the energy storage device, a lighting system is proposed in which a power generation panel is disposed at a position where the panel can receive light irradiated from the light source.

SUMMARY

In the above-described lighting system, even during the night when there is no sunlight, the power generation panel can generate electric power using the light irradiated from the light source. In other words, compared to a lighting device that uses electric power generated by sunlight alone, the above-described lighting system can generate electric power using more light, and so the lighting system can reduce the electric power consumption of the energy storage device. Therefore, compared to a lighting device that uses electric power generated by sunlight alone, the above-described lighting system can cause the light source to be illuminated for a longer time period. However, even in the above-described lighting system, if there is a continuing lack of sunlight and there is insufficient electric power stored in the energy storage device, a case may arise in which the light source cannot be illuminated and electric power needs to be supplied from an external power source. It is therefore desirable to further suppress the electric power consumption of the energy storage device and accordingly to further extend the time period in which the light source can be illuminated (hereinafter referred to an illumination time).

Various embodiments of the broad principles derived herein provide a lighting device that can suppress electric power consumption of an energy storage device and extend an illumination time of a light source.

Embodiments herein provide a lighting device that includes a light emitting diode (LED) lamp, a power generating panel, a storage battery, a lamp drive portion, a remaining amount detection portion, and a control portion. The power generating panel is disposed at a position where the power generating panel is capable of receiving sunlight and light irradiated by the LED lamp. The power generating panel is configured to generate electric power by receiving the sunlight and the light irradiated by the LED lamp. The storage battery is configured to store the electric power generated by the power generating panel and to supply the electric power to the LED lamp. The lamp drive portion is configured to drive the LED lamp using pulse signals. The remaining amount detection portion is configured to detect a remaining amount of the electric power stored in the storage battery. The control portion is configured to control, in accordance with the remaining amount detected by the remaining amount detection portion, a pulse width and a period that are used when the lamp drive portion drives the LED lamp.

BRIEF DESCRIPTION OF THE DRAWINGS

Exemplary embodiments of the present disclosure will be described below in detail with reference to the accompanying drawings in which.

DETAILED DESCRIPTION

Figure 1:
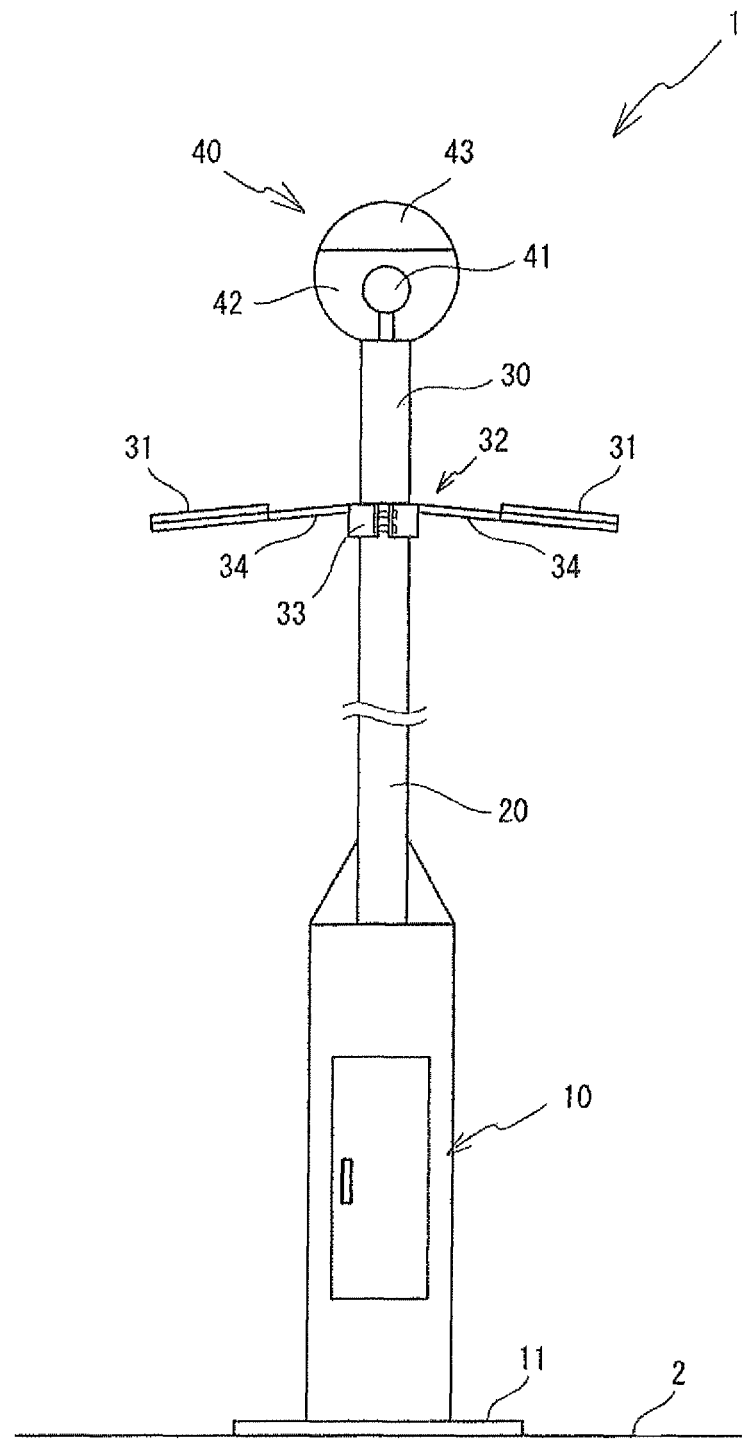
FIG. 1 is a front view showing an external appearance of a lighting device.

Hereinafter, a lighting device 1 according to an embodiment of the present disclosure will be explained with reference to the drawings. The lighting device 1 of the present embodiment is configured as a street lamp that is illuminated using electric power generated by receiving sunlight and lamp light. First, an outline configuration of the lighting device 1 as a whole will be explained with reference to FIG. 1. As shown in FIG. 1, the lighting device 1 includes a control box 10, a support pillar 20, two types of solar panels 30 and 31, and a lighting portion 40. A height of the lighting device 1 is, for example, approximately 5 meters.

The control box 10 is formed of a fiber reinforced plastic (FRP) material in a rectangular box shape. The control box 10 includes a base portion 11 that protrudes horizontally in an outward direction at the lower end of the control box 10. The base portion 11 is fixed to a ground surface 2, or is fixed to an embedded box (not shown in the drawings) that is embedded below the ground surface 2. The base portion 11 thus inhibits the lighting device 1 from falling over. An internal configuration of the control box 10 will be explained in detail later.

The support pillar 20, which extends in an upward direction, is connected to the upper end of the control box 10. The support pillar 20 is formed of an FRP material in a cylindrical shape. Various wires pass through a hollow internal portion of the support pillar 20.

The lighting portion 40 is provided on the upper end of the support pillar 20. The lighting portion 40 includes a lamp 41, a cover member 42 and a reflector 43. The lamp 41 of the present embodiment is a high-intensity white light emitting diode (LED) lamp bulb that has a rated voltage of 12 volt (V) and a rated power consumption of 6 watt (W). The lamp 41 is capable of outputting 100 W class brightness of an incandescent light bulb. The cover member 42 is formed of a transparent material (an acrylic resin material, for example) in a spherical shape, and covers the lamp 41. The lamp 41 is disposed in a central portion inside the cover member 42 such that a center of the irradiated light of the lamp 41 is directed in the upward direction. In order to reflect the irradiated light of the lamp 41, the reflector 43 is disposed on an inner surface of an upper portion of the cover member 42. In the present embodiment, a surface (the surface on the side of the inner portion of the cover member 42) of the reflector 43 is coated with fluorescent paint or with luminous paint. The fluorescent paint is a paint that emits light when it is irradiated by ultraviolet rays. The luminous paint is a paint that absorbs and stores the ultraviolet rays and emits light when it is dark.

The solar panels 30 and 31 each have solar cells, and are devices that are configured to convert light energy to electrical energy. In other words, the solar panels 30 and 31 are configured to generate electric power by receiving light. The solar panel 30 is formed in a sheet shape having flexibility, and is disposed such that the solar panel 30 encircles a peripheral surface of the support pillar 20 below the lighting portion 40. In the present embodiment, a solar panel with a maximum output of 5 W is adopted as the solar panel 30.

A plate shaped solar panel is adopted as the solar panel 31. In the present embodiment, two of the solar panels 31 each having a maximum output of 10 W are provided. The solar panels 31 are attached to the support pillar 20 by a mounting member 32, below the solar panel 30. The mounting member 32 includes a fixing portion 33, which is fixed to the support pillar 20 by screws such that it sandwiches the support pillar 20, and two bar-shaped support portions 34 that extend from the fixing portion 33 in opposing directions with the support pillar 20 at the center. The two solar panels 31 are respectively supported by the two support portions 34 in a state in which light receiving surfaces (surfaces that generate electric power) of the solar cells are facing upward.

The solar panels 30 and 31 are disposed at positions where the solar panels 30 and 31 can each receive sunlight as well as light irradiated from the lamp 41. The LED lamp bulb is a light-focusing type light source. However, as mentioned above, as the reflector 43 is provided on the inner surface of the upper portion of the spherical shaped cover member 42, the light reflected by the reflector 43 reaches the solar panels 30 and 31. In particular, the solar panels 31 are disposed in a state in which the light receiving surfaces of the solar cells are facing upward, and thus the solar panels 31 can efficiently receive both sunlight and the light irradiated from the lamp 41. Note that, in order for the lighting device 1 to be oriented such that the lighting device 1 can efficiently receive sunlight, an installation angle of the solar panel 31 with respect to the ground surface 2 may be made adjustable.

Figure 2:
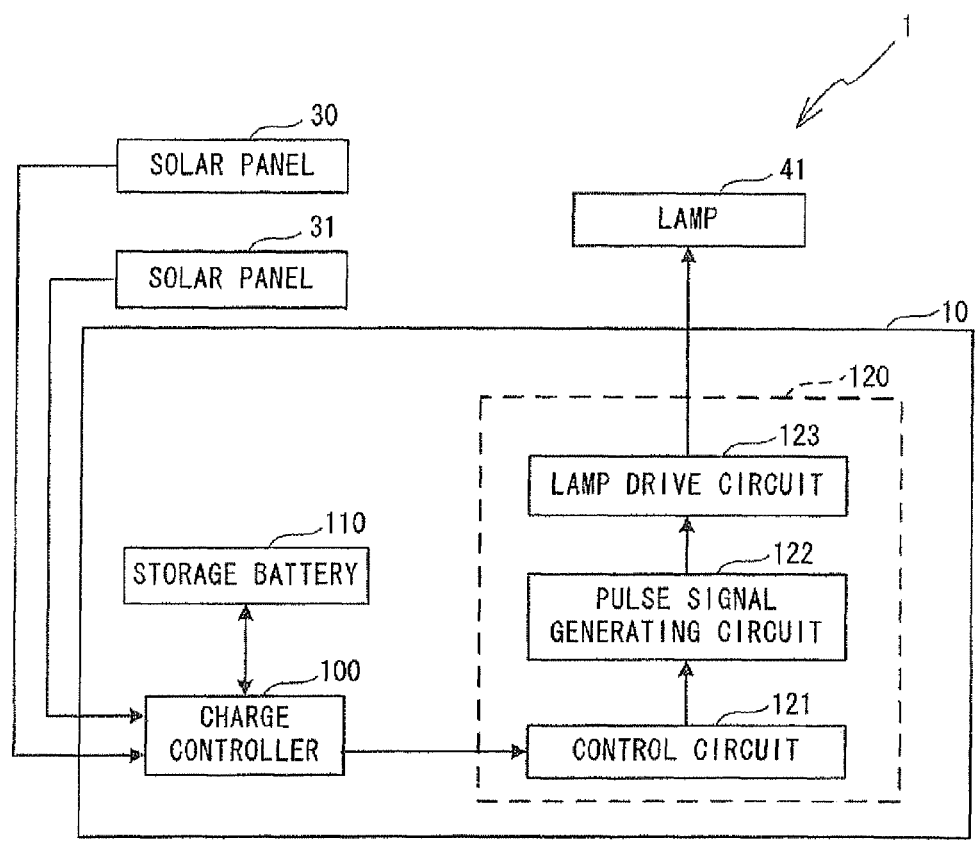
FIG. 2 is a block diagram showing an electrical configuration of the lighting device.

Electrical connection relationships of the lighting device 1, including a configuration provided inside the control box 10, will be explained with reference to FIG. 2. As shown in FIG. 2, the control box 10 includes a charge controller 100, a storage battery 110 and an LED drive control portion 120 inside.

The charge controller 100 is connected, respectively, to the solar panels 30 and 31, to the storage battery 110 and to the LED drive control portion 120. The charge controller 100 is a general charge controller and has functions to inhibit overcharge and overdischarge of the storage battery 110, to inhibit backflow current from the storage battery 110, to detect a remaining amount of electric power stored in the storage battery 110 (hereinafter simply referred to as the remaining battery charge) the storage battery 110, to detect an amount of electric power generated by the solar panels 30 and 31 and so on. A configuration to achieve these functions is well-known and thus an explanation thereof is omitted here.

In the present embodiment, as described above, the maximum output of the solar panel 30 is 5 W and the maximum output of each of the two solar panels 31 is 10 W. Thus, a maximum 25 W of electric power can be transmitted to the charge controller 100 by the three solar panels 30 and 31. The storage battery 110 is a general storage battery. In the present embodiment, a 12V, 50 ampere hour (Ah) storage battery is adopted, and when the battery is fully charged, the voltage is approximately 14V. The charge controller 100 supplies a drive signal to the lamp 41 via the LED drive control portion 120.

The LED drive control portion 120 includes a control circuit 121 that is connected to the charge controller 100, a pulse signal generating circuit 122 that is connected to the control circuit 121, and a lamp drive circuit 123 that is connected to the pulse signal generating circuit 122. The lamp drive circuit 123 is connected to the lamp 41.

The control circuit 121 is a circuit that generates a control signal based on a signal output from the charge controller 100 and outputs the generated control signal to the pulse signal generating circuit 122. The pulse signal generating circuit 122 is a circuit that receives the control signal from the control circuit 121, generates a pulse signal to drive the lamp 41, and outputs the pulse signal to the lamp drive circuit 123. The lamp drive circuit 123 is a circuit that generates a drive current (a pulse) using a pulse width and a pulse period that are in accordance with the pulse signal from the pulse signal generating circuit 122, and causes the lamp 41 to emit light. Specifically, in the present embodiment, the lamp 41 is driven using pulse signals.

Figure 3:
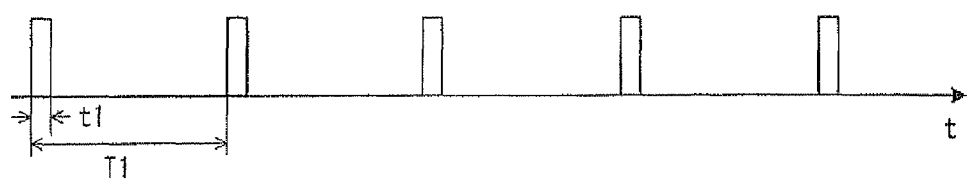
FIG. 3 is an explanatory diagram of a period and a pulse width to be used when a remaining battery charge of a storage battery is equal to or more than a first threshold value.
Figure 4:
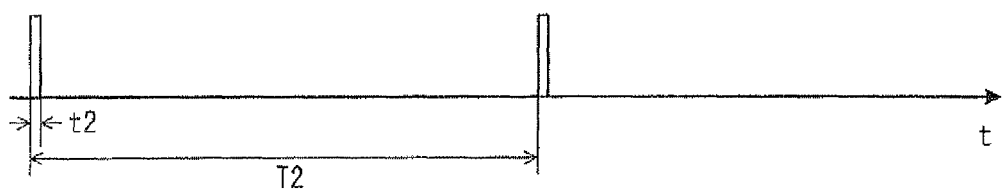
FIG. 4 is an explanatory diagram of a period and a pulse width to be used when the remaining battery charge of the storage battery is equal to or more than a second threshold value and less than the first threshold value.
Figure 5:
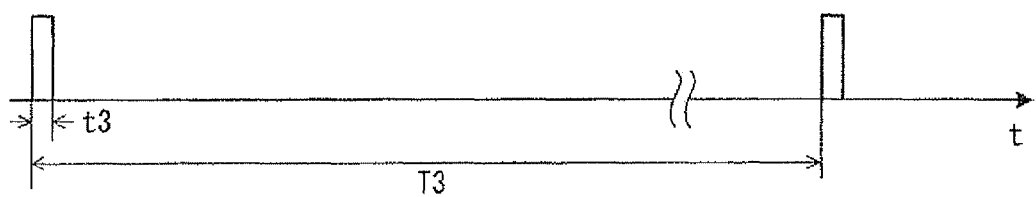
FIG. 5 is an explanatory diagram of a period and a pulse width to be used when the remaining battery charge of the storage battery is less than the second threshold value.

The drive control of the lamp 41 according to the present embodiment will be explained in more detail with reference to FIG. 3 to FIG. 5. In the present embodiment, the pulse width and the pulse period for driving the lamp 41 are controlled by the control circuit 121 and the pulse signal generating circuit 122 in accordance with the remaining battery charge. More specifically, when the remaining battery charge of the storage battery 110 falls below a predetermined first threshold value, the duty cycle for driving the lamp 41 is set to a value that is smaller than the duty cycle to be used when the remaining battery charge is equal to or more than the first threshold value. Note that the duty cycle refers to a ratio of the pulse width with respect to the period when the pulse is periodically supplied. When the remaining battery charge of the storage battery 110 reduces further and falls below a second threshold value that is smaller than the first threshold value, the lamp 41 is illuminated intermittently by the control circuit 121 and the pulse signal generating circuit 122 by a period that is longer than the pulse period to be used when the remaining battery charge is equal to or more than the second threshold value and less than the first threshold value.

In order to execute the above-described control, the charge controller 100 detects the remaining battery charge of the storage battery 110 and outputs a different signal to the control circuit 121 for each of three cases, namely, when the remaining battery charge is equal to or more than the first threshold value, when the remaining battery charge is equal to or more than the second threshold value and less than the first threshold value, and when the remaining battery charge is less than the second threshold value. Note that, although not shown in the drawings, the lighting device 1 is provided with an illuminance sensor, and the charge controller 100 outputs the signal to the control circuit 121 only during a period in which the illuminance detected by the illuminance sensor is equal to or less than a predetermined value. Thus, the lighting device 1 performs the following control only during the period in which the illuminance detected by the illuminance sensor is equal to or less than the predetermined value.

In the present embodiment, when the signal from the charge controller 100 is the signal indicating that the remaining battery charge is equal to or more than the first threshold value, the control circuit 121 outputs, to the pulse signal generating circuit 122, a control signal indicating a period T1 and a pulse width t1. When the period is T1 and the pulse width is t1, the duty cycle is t1/T1 (hereinafter referred to as a first duty cycle). In the present embodiment, with respect to the voltage of 14V when the storage battery 110 is fully charged, the first threshold value is set in advance as 12.3V. Further, the period T1 is set in advance as a frequency of 100 Hz (100 cycles per second) and the first duty cycle (t1/T1) is set in advance as a value between $\frac{1}{10}$ (10%) to $\frac{1}{20}$ (5%).

When the LED lamp bulb such as that used in the lamp 41 is pulse driven, the LED lamp bulb is periodically switched on and off. For that reason, if the period is too long (if the frequency is too low), the human eyes may be bothered by flickering. In general, it is considered that flickering can be inhibited sufficiently when the frequency is 100 Hz. Thus, in the present embodiment, the above-described period T1 is set for a case in which the remaining battery charge is equal to or more than the first threshold value. Note that, when the LED lamp bulb is driven at a duty cycle of $\frac{1}{10}$, for example, it is possible to reduce the electric power used by the storage battery 110 to $\frac{1}{10}$ compared to a case in which the LED lamp bulb is driven by a direct current at the same current value. For that reason, in the present embodiment, electric power consumption may be reduced by setting the first duty cycle (t1/T1) between $\frac{1}{10}$ (10%) and $\frac{1}{20}$ (5%).

When the remaining battery charge is equal to or more than the first threshold value, the pulse signal generating circuit 122 receives the control signal from the control circuit 121 every period T1. Then, as shown in FIG. 3, a time point at which the control signal is received is used as a pulse start time point, and the pulse signal having the pulse width t1 is generated and output to the lamp drive circuit 123. More specifically, at a timing of each period T1, a high level pulse signal is output over a duration that corresponds to the pulse width t1.

The lamp drive circuit 123 includes a switching element, and receives the pulse signal from the pulse signal generating circuit 122. While the pulse signal is at the high level, the lamp drive circuit 123 switches the switching element on and supplies a drive current of a predetermined magnitude to the lamp 41. On the other hand, while the pulse signal is at a low level, the lamp drive circuit 123 switches the switching element off and stops the supply of the drive current to the lamp 41. In this way, the lamp drive circuit 123 causes the lamp 41 to emit light over a duration that corresponds to the pulse width t1, for every period T1. Due to this type of control, when the remaining battery charge of the storage battery 110 is equal to or more than the first threshold value, the lamp 41 is pulse driven at the first duty cycle, which can reduce electric power consumption in comparison to a case in which the lamp 41 is driven by a direct current, while inhibiting flickering.

When the signal from the charge controller 100 is the signal indicating that the remaining battery charge is equal to or more than the second threshold value and less than the first threshold value, the control circuit 121 outputs, to the pulse signal generating circuit 122, a control signal indicating a period T2 and a pulse width t2. The duty cycle at this time is t2/T2 (hereinafter referred to as a second duty cycle). In the present embodiment, with respect to the voltage of 14V when the storage battery 110 is fully charged, the second threshold value is set in advance as 11V. Further, the period T2 is set in advance as a frequency of 50 Hz and the second duty cycle (t2/T2) is set in advance as a value between $\frac{1}{50}$ (2%) to $\frac{1}{100}$ (1%). In other words, the period T2 is longer than the period T1, and the second duty cycle (t2/T2) is set to a smaller value than the first duty cycle (t1/T1).

When the frequency becomes as low as 50 Hz, there is a possibility that the human eyes can perceive flickering. However, in the present embodiment, when the remaining battery charge falls below the first threshold value, further reducing electric power consumption is accorded a higher priority over inhibiting flickering. Thus, as described above, the period T2 is changed to the reduced frequency of 50 Hz. Further, when the duty cycle becomes smaller, the time that the lamp 41 is illuminated during the period becomes shorter and thus the smaller the duty cycle, the darker the lamp 41 appears to be. On the other hand, the smaller the duty cycle becomes, the more it is possible to reduce electric power consumption. In the present embodiment, when the remaining battery charge of the storage battery 110 falls below the first threshold value, further reliable reduction of electric power consumption is prioritized, and thus the second duty cycle (t2/T2) is set to be smaller than the first duty cycle (t1/T1).

When the remaining battery charge is equal to or more than the second threshold value and is less than the first threshold value, the pulse signal generating circuit 122 receives the signal from the control circuit 121 every period T2. Then, as shown in FIG. 4, a time point at which the control signal is received is used as a pulse start time point, and the pulse signal having the pulse width t2 is generated and output to the lamp drive circuit 123. More specifically, at a timing of each period T2, a high level pulse signal is output over a duration that corresponds to the pulse width t2. The lamp drive circuit 123 operates in the manner described above, and causes the lamp 41 to emit light over a duration that corresponds to the pulse width t2, for every period T2. Due to this type of control, when the remaining battery charge of the storage battery 110 is equal to or more than the second threshold value and is less than the first threshold value, the lamp 41 is darker than in the case in which the remaining battery charge is equal to or more than the first threshold value, but is driven using less electric power. As a result, it is possible to extend the illumination time of the lamp 41 compared to a case in which the lamp 41 is continuously driven at the first duty cycle.

Furthermore, when the signal from the charge controller 100 is the signal indicating that the remaining battery charge is less than the second threshold value, the control circuit 121 outputs, to the pulse signal generating circuit 122, a control signal indicating a period T3 and a pulse width t3. The period T3 is set to be a longer period than the period T1 and the period T2. In the present embodiment, the period T3 is set as 1 Hz. The pulse width t3 is set to an appropriate value with respect to the period T3 such that the lamp 41 will illuminate intermittently. In the present embodiment, a third duty cycle (t3/T3) is approximately $\frac{1}{1000}$, and the lamp 41 illuminates approximately once every second.

When the remaining battery charge is less than the second threshold value, the pulse signal generating circuit 122 receives the control signal from the control circuit 121 every period T3. Then, as shown in FIG. 5, a time point at which the control signal is received is used as a pulse start time point, and the pulse signal having the pulse width t3 is generated and output to the lamp drive circuit 123. More specifically, at a timing of each period T3, a high level pulse signal is output over a duration that corresponds to the pulse width t3. Further, the lamp drive circuit 123 operates in the manner described above, and causes the lamp 41 to emit light over a duration that corresponds to the pulse width t3, for every period T3.

When the frequency is reduced to 1 Hz and the pulse width t3 is set such that the lamp 41 is illuminated intermittently, the lamp 41 is in a state in which it flashes on and off every second. Therefore, the human eyes can clearly recognize that the lamp 41 is in a different state to that of the case in which the remaining battery charge of the storage battery 110 is equal to or more than the second threshold value. In this way, while reducing the electric power consumption of the storage battery 110 to a minimum, it is possible to visually notify a person nearby that the remaining battery charge of the storage battery 110 is low. In this way, the person seeing the flashing of the lamp 41 can take action as needed, such as supplying electric power from an external power source to the lighting device 1.

As described above, the lighting device 1 of the present embodiment can generate electric power by receiving light from the lamp 41, as well as sunlight, and illuminate the lamp 41 using the electric power stored in the storage battery 110. Furthermore, the lamp 41 is driven by using the pulse signals in accordance with the amount of remaining electric power stored in the storage battery 110. More specifically, the pulse width and the pulse period are controlled such that the consumption of electric power of the storage battery 110 becomes lower as the remaining battery charge of the storage battery 110 becomes smaller (equal to or more than the first threshold value, equal to or more than the second threshold value and less than the first threshold value, and less than the second threshold value). In this way, it is possible to extend the period of time over which the lamp 41 is illuminated by the remaining electric power.

In addition, with the lighting device 1 of the present embodiment, it is possible to extend an afterglow time by the fluorescent paint or the luminous paint applied on the reflector 43 on the upper portion of the internal surface of the cover member 42 of the lamp 41. Therefore, even if the lamp 41 is driven by using the pulse signals, it is possible to suppress a sense of flickering compared to a case in which the fluorescent paint or the luminous paint is not applied. The duty cycle can therefore be smaller than in the case in which the fluorescent paint or the luminous paint is not applied, and it is thus possible to suppress electric power consumption. In particular, even when the remaining battery charge of the storage battery 110 falls below the first threshold value and the second duty cycle that is smaller than the first duty cycle is used, it is possible to suppress the sense of flickering.

Various modifications can be made to the above-described embodiment. For example, the above-described embodiment is an example in which the two threshold values, namely the first threshold value and the second threshold value, are used and the lamp 41 is driven by using the pulse signals that are changed in three stages, namely when the remaining battery charge of the storage battery 110 is equal to or more than the first threshold value, when the remaining battery charge is equal to or more than the second threshold value and less than the first threshold value, and when the remaining battery charge is less than the second threshold value. However, the method by which the lamp 41 is driven using the pulse signals is not limited to the example of the above-described embodiment.

Hereinafter, a lighting device 5 according to a modified example will be explained with reference to FIG. 6 and FIG. 7. Note that a configuration of the lighting device 5 according to the modified example is substantially the same as the configuration of the lighting device 1 of the above-described embodiment. Thus, in FIG. 6 and FIG. 7, where the configuration is the same, the same reference numerals are assigned, and an explanation thereof is omitted or simplified. Below, the explanation will be made while concentrating on the configuration and operations that are different to those of the lighting device 1. It should be noted that, in FIG. 6, a lower portion of the lighting device 5 has the same configuration as that of the lighting device 1, and is therefore not shown in FIG. 6.

Figure 6:
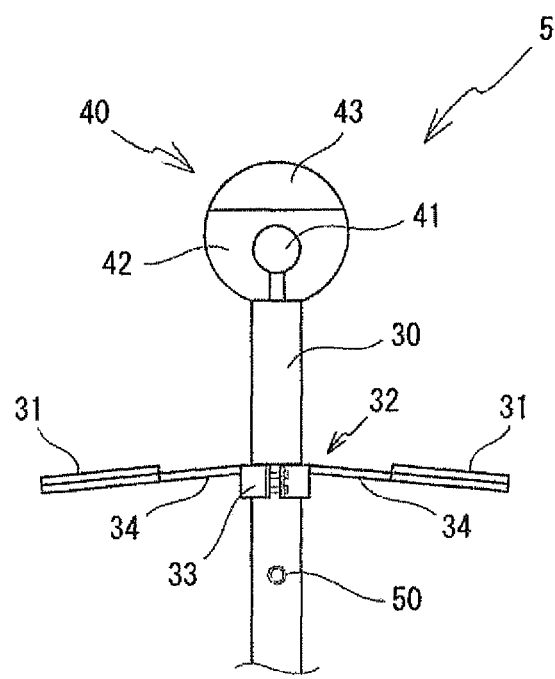
FIG. 6 is a front view showing a part of an external appearance of a lighting device according to a modified example.

As shown in FIG. 6, the lighting device 5 includes an emergency lamp 50, in addition to the control box 10 (refer to FIG. 1), the support pillar 20, the solar panels 30 and 31 and the lighting portion 40 which are the same as in the lighting device 1. The emergency lamp 50 is provided on the support pillar 20, below the mounting member 32 of the solar panels 31. The emergency lamp 50 of the present embodiment is an LED lamp with a power consumption equal to or less than 0.2 W. In other words, the emergency lamp 50 is an LED lamp bulb that has a significantly lower electric power consumption in comparison to the lamp 41.

Figure 7:
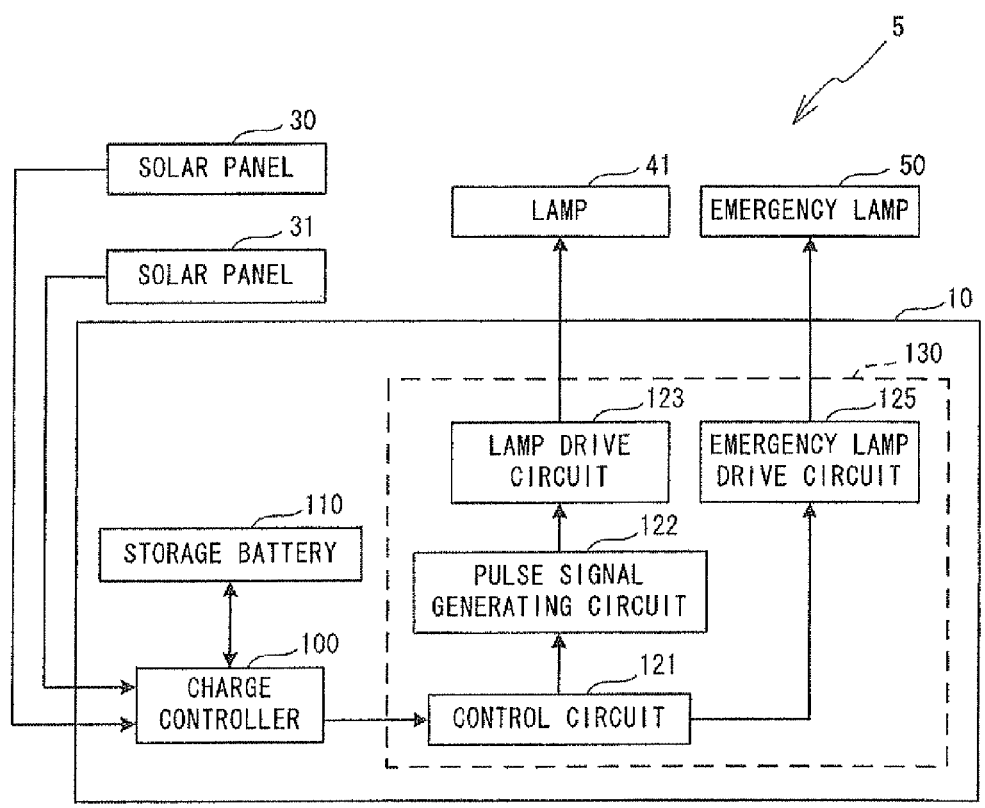
FIG. 7 is a block diagram showing an electrical configuration of the lighting device according to the modified example.

Further, as shown in FIG. 7, the charge controller 100 also supplies a drive signal to the emergency lamp 50 via an LED drive control portion 130.

In addition to the control circuit 121, the pulse signal generating circuit 122 and the lamp drive circuit 123 that are the same as the above-described embodiment, the LED drive control portion 130 of the present embodiment includes an emergency lamp drive circuit 125 that is connected to the control circuit 121. The emergency lamp drive circuit 125 is a circuit that receives a control signal from the control circuit 121 and drives the emergency lamp 50 using a direct current. The emergency lamp drive circuit 125 is connected to the emergency lamp 50.

In the lighting device 5 according to the modified example, drive control of the lamp 41 and the emergency lamp 50 is performed in three stages, namely, when the remaining battery charge of the storage battery 110 is equal to or more than the first threshold value, when the remaining battery charge is equal to or more than a third threshold value and less than the first threshold value and when the remaining battery charge is less than the third threshold value. The third threshold value is a threshold value at which it is determined that the lamp 41 will not be illuminated and the emergency lamp 50 will be illuminated. The third threshold value is 11V, for example, which is the same as the second threshold value of the above-described embodiment. However, the third threshold value may be a different value to the second threshold value.

In the lighting device 5 according to the modified example, when the remaining battery charge of the storage battery 110 is equal to or more than the first threshold value, similarly to the above-described embodiment, the lamp 41 is illuminated at the first duty cycle. When the remaining battery charge is equal to or more than the third threshold value and less than the first threshold value, similarly to the above-described embodiment, the lamp 41 is illuminated at the second duty cycle. On the other hand, when the signal from the charge controller 100 indicates that the remaining battery charge is less than the third threshold value, in contrast to the above-described embodiment, the control circuit 121 outputs, to the emergency lamp drive circuit 125, a control signal that instructs illumination of the emergency lamp 50. The emergency lamp drive circuit 125 drives the emergency lamp 50 to emit light using a direct current. During this time, the control circuit 121 does not output, to the pulse signal generating circuit 122, the control signal to drive the lamp 41. In this way, when the remaining battery charge of the storage battery 110 is less than the third threshold value, only the emergency lamp 50 is illuminated in the lighting device 5.

According to the lighting device 5 of the modified example, after the remaining battery charge of the storage battery 110 has fallen below the first threshold value, the electric power consumed is reduced by driving the lamp 41 at the second duty cycle. Nevertheless, if the remaining battery charge further falls below the third threshold value, the emergency lamp 50, whose electric power consumption is significantly lower, is driven in place of the lamp 41. In this way, the lighting device 5 can achieve a role as a minimum light source even in a time of emergency, while suppressing electric power consumption of the storage battery 110 to a minimum. The emergency lamp 50 cannot emit sufficient light as a street lamp, but can be a useful landmark, particularly when there is a disaster or the like. Further, in a case where the emergency lamp 50 is illuminated when there is no disaster or the like, the emergency lamp 50 can indicate that an error (the insufficient battery charge, the end of the battery life, or the like) has occurred in the storage battery 110 itself.

Apart from the above-described modified example, various modifications to the above-described embodiment are possible. For example, the lighting device 1 of the above-described embodiment illuminates the lamp 41 only when the illuminance detected by the illuminance sensor is equal to or less than a predetermined value, but a configuration may be adopted in which the lamp 41 is illuminated only when a power generation amount of the solar panels 30 and 31 does not reach a minimum amount that is set in advance. As mentioned above, the known charge controller 100 has the function to detect the power generation amount of the solar panels 30 and 31. Thus, the LED drive control portion 120 may operate as in the above-described embodiment only when the signal output from the charge controller indicates that the power generation amount is less than the minimum power generation amount.

In this case, the lamp 41 is not driven when the power generation amount is equal to or more than the minimum amount, and the lamp 41 is only driven when the power generation amount is less than the minimum amount. During the night, when power is generated only by light from the lamp 41 and not by sunlight, the power generation amount is of course significantly lower than during the day when there is sunlight. Further, when it is rainy, cloudy, or in a place that is dim even during the daytime, such as in a forest, the power generation amount is greater than in the night-time, but is smaller in comparison to an open place in fine weather. Therefore, by performing measurements of the power generation amount through experimentation in advance under various conditions, and by setting the minimum amount, it is possible to illuminate the lamp 41 at an appropriate time and place.

In addition, the above-described quantity, size, position, voltage and electric power consumption value of the solar panels 30 and 31, the storage battery 110, the lamp 41, the emergency lamp 50 and the like are merely examples, and can of course be changed as appropriate. For example, the lighting device 1 need not necessarily include the solar panel 30 and may include the solar panels 31 only. The number of the solar panels 31 is not limited to two. The lighting device 1 need not necessarily include the solar panels 31 and may include the solar panel 30 only. The type of the solar cells used in the solar panels 30 and 31 is not particularly limited, and a desired type can be used, such as silicon solar cells (single-crystal silicon, poly-crystalline silicon, amorphous silicon and so on), compound solar cells, dye-sensitized solar cells, organic thin-film solar cells or the like. Note that it is preferable for the solar panel 31 to be a semi-transparent or transparent film-shaped or plate-shaped solar panel, because in this case, it is possible to suppress a shadow caused by the solar panel 31.

Also, the configuration of the lighting portion 40 is not limited to the example of the above-described embodiment, and can be changed as appropriate. For example, the cover member 42 need not necessarily have a spherical shape and may have another shape. As long as the solar panels 30 and 31 can receive the light irradiated from the lamp 41, the orientation of the lamp 41, and the disposition and presence or absence of the reflector 43 can also be changed. For example, the lamp 41 may be disposed such that the center of the irradiated light is in the downward direction. The reflector 43 need not necessarily be coated with the fluorescent paint or the luminous paint.

The pulse period and the pulse width when the lamp 41 is driven need not necessarily be changed in three stages as in the above-described embodiment and may be change in two stages. For example, the duty cycle may be switched between the first duty cycle and the second duty cycle when the remaining battery charge is equal to or more than the first threshold value and when the remaining battery charge is less than the first threshold value. Alternatively, the period and the pulse width may be changed in four or more stages. For example, the third threshold value of the modified example may be set to be smaller than the second threshold value, and the LED drive control portion 130 may perform control to cause the lamp 41 to flash, as in the above-described embodiment, when the remaining battery charge of the storage battery 110 is equal to or more than the third threshold value and less than the second threshold value, and perform control to cause only the emergency lamp 50 to be illuminated when the remaining battery charge is less than the third threshold value.

Further, the pulse period and the pulse width and the threshold value to change the pulse period and the pulse width (12.3V and 11V in the above-described embodiment) are not limited to the examples in the embodiment, and may be other values. The threshold value need not necessarily be a voltage, and may be prescribed by state of charge (%).

The pulse period and the pulse width can be set in the following manner, for example. First, using the electric power that is generated by the solar panels 30 and 31 by receiving actual sunlight and light from the lamp 41 and that is stored in the storage battery 110, the lamp 41 is caused to illuminate at various periods and pulse widths. Appropriate values may be set based on a result of investigating a relationship between the remaining battery charge of the storage battery 110 at this time and an illumination time period. Note that these values are of course different depending on a type of the solar panels 30 and 31, of the storage battery 110 and of the lamp 41 etc.

In the above-described embodiment, the configuration example of the LED drive control portion 120 includes a plurality of circuits, but the control circuit 121 may be configured, for example, as a microcomputer having a built in program that generates a control signal in accordance with a signal from the charge controller 100. In other words, in place of the control circuit 121, the controls explained in the embodiment and the modified example may be realized by a memory storing computer-readable instructions and a processor that operates in accordance with the instructions.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A lighting device comprising:
   a light emitting diode (LED) lamp;
   a power generating panel that is disposed at a position where the power generating panel is capable of receiving sunlight and light irradiated by the LED lamp, and that is configured to generate electric power by receiving the sunlight and the light irradiated by the LED lamp, the power generating panel being located at a lower position than the LED lamp;
   a storage battery that is configured to store the electric power generated by the power generating panel and to supply the electric power to the LED lamp;
   a lamp drive portion that is configured to drive the LED lamp using pulse signals;
   a remaining amount detection portion that is configured to detect a remaining amount of the electric power stored in the storage battery; and
   a control portion that is configured to control, in accordance with the remaining amount detected by the remaining amount detection portion, a pulse width and a period that are used when the lamp drive portion drives the LED lamp,
   wherein the control portion is configured to cause the lamp drive portion to drive the LED lamp at a first duty cycle when the remaining amount detected by the remaining amount detection portion is equal to or more than a first threshold value, the first duty cycle being a ratio of a first pulse width with respect to a first period, and
   wherein the control portion is configured to cause the lamp drive portion to drive the LED lamp at a second duty cycle when the remaining amount is less than the first threshold value, the second duty cycle being a ratio of a second pulse width with respect to a second period and being smaller than the first duty cycle, the second period being longer than the first period.

2. The lighting device according to claim 1, wherein the control portion is configured to cause the lamp drive portion to drive the LED lamp intermittently every third period when the remaining amount detected by the remaining amount detection portion is less than a second threshold value, the second threshold value being smaller than the first threshold value and the third period being a longer period than the first period and the second period.

3. The lighting device according to claim 1, further comprising:
   an LED emergency light source with a power consumption that is smaller than a power consumption of the LED lamp; and
   an emergency light source drive portion that drives the LED emergency light source,
   wherein
   the control portion is configured to cause the emergency light source drive portion to drive the LED emergency light source when the remaining amount detected by the remaining amount detection portion is less than a third threshold value, the third threshold value being smaller than the first threshold value.

4. The lighting device according to claim 1, further comprising:
   a reflector that is configured to reflect the light irradiated from the LED lamp, a surface of the reflector being coated with one of luminous paint and fluorescent paint.

5. The lighting device according to claim 2, further comprising:
   an LED emergency light source with a power consumption that is smaller than a power consumption of the LED lamp; and
   an emergency light source drive portion that drives the LED emergency light source,
   wherein
   the control portion is configured to cause the emergency light source drive portion to drive the LED emergency light source when the remaining amount detected by the remaining amount detection portion is less than a third threshold value, the third threshold value being smaller than the first threshold value and the second threshold value.

* * * * *